United States Patent
Westphal et al.

(10) Patent No.: US 8,290,639 B2
(45) Date of Patent: Oct. 16, 2012

(54) MANAGING CONTROL SURFACES FOR AN AIRCRAFT

(75) Inventors: Jendrick Westphal, Hamburg (DE); Nico Zimmer, Rheinland-Pfalz (DE)

(73) Assignee: The Boeing Company, Chicago, IL (US)

( * ) Notice: Subject to any disclaimer, the term of this patent is extended or adjusted under 35 U.S.C. 154(b) by 50 days.

(21) Appl. No.: 12/939,361

(22) Filed: Nov. 4, 2010

(65) Prior Publication Data

US 2012/0116611 A1    May 10, 2012

(51) Int. Cl.
*G01C 23/00*    (2006.01)

(52) U.S. Cl. ............ 701/3; 701/13; 244/75.1; 244/76 R; 340/8.1

(58) Field of Classification Search ................ 701/3, 11, 701/13, 14, 15; 244/158.1, 75.1, 76 R; 340/8.1
See application file for complete search history.

(56) References Cited

U.S. PATENT DOCUMENTS

| | | | |
|---|---|---|---|
| 3,496,769 A | 2/1970 | Vietor | |
| RE31,159 E | 2/1983 | Sicre | |
| 6,985,091 B2 * | 1/2006 | Price | 340/975 |
| 7,075,457 B1 | 7/2006 | Chidester et al. | |
| 7,161,501 B1 | 1/2007 | Lynch et al. | |
| 7,212,135 B1 | 5/2007 | Lynch et al. | |
| 7,259,693 B2 * | 8/2007 | Miller et al. | 340/945 |

* cited by examiner

*Primary Examiner* — Gertrude Arthur Jeanglaude
(74) *Attorney, Agent, or Firm* — Yee & Associates, P.C.

(57) ABSTRACT

A method and apparatus for managing a number of control surfaces for an aircraft. A current configuration for the number of control surfaces for the aircraft is identified during flight of the aircraft. A selected point in time at which the current configuration for the number of control surfaces is to be changed to a new configuration for the number of control surfaces is identified. A portion of time relative to the selected point in time during which the current configuration for the number of control surfaces is to be changed to the new configuration is identified based on a difference between a current amount of energy for the aircraft and an expected amount of energy for the aircraft.

25 Claims, 5 Drawing Sheets

MANAGING CONTROL SURFACES FOR AN AIRCRAFT

BACKGROUND INFORMATION

1. Field

The present disclosure relates generally to aircraft and, in particular, to control surfaces for an aircraft. Still more particularly, the present disclosure relates to a method and apparatus for managing a configuration of a number of control surfaces for an aircraft.

2. Background

Control surfaces are present on an aircraft. A control surface allows a pilot to adjust the flight of an aircraft. A control surface may be used to control the flight of an aircraft through various axes with respect to the aircraft. For example, a control surface may be used to control pitch, roll, and/or yaw of an aircraft.

Primary control surfaces allow a pilot to control the yaw, pitch, and/or roll of an aircraft. Primary control surfaces include ailerons, rudders, and elevators. All other control surfaces are secondary control surfaces. Secondary control surfaces may change the energy rate of the aircraft. For example, a secondary control surface may be a control surface that changes drag. Secondary control surfaces include, for example, flaps, slats, spoilers, airbrakes, and other types of control surfaces.

During the flight of an aircraft, pilots are often given instructions to extend control surfaces, such as flaps. The extension of flaps may be used to change the speed of the aircraft. In particular, extending the flaps may slow down the speed of the aircraft and/or change the glide path of the aircraft. Typically, the pilot may extend the flaps at a particular location during the flight of the aircraft. This location may be described in terms of latitude, longitude, and altitude. The change in the flight of the aircraft may be used to manage air traffic flow around areas, such as airports.

Additionally, in some cases, the extension of the flap also may be performed at a particular point in time, in addition to a given latitude, longitude, and altitude. With this type of extension of flaps, the change in the flight of the aircraft may be referred to as a four-dimensional flight path. The use of four dimensions may be employed to fit more aircraft into the same airspace.

Currently, the changes in flap configurations are set based on aircraft speed. Once a selected aircraft speed is reached, a particular instruction may be given to change the configuration of a flap.

With flight planning using four dimensions, the timing of changes in the configuration of flaps becomes more important in managing traffic. Additionally, the timing of and the changes in the configuration of flaps may be important to fuel usage of the aircraft during flight. Depending on how and when flaps are extended, fuel usage may be increased to amounts that may be less desirable.

Thus, it would be advantageous to have a method and apparatus that takes into account at least one of the issues discussed above, as well as other possible issues.

SUMMARY

In one illustrative embodiment, a method is provided for managing a number of control surfaces for an aircraft. A current configuration for the number of control surfaces for the aircraft is identified during flight of the aircraft. A selected point in time at which the current configuration for the number of control surfaces is to be changed to a new configuration for the number of control surfaces is identified. A portion of time relative to the selected point in time during which the current configuration for the number of control surfaces is to be changed to the new configuration is identified based on a difference between a current amount of energy for the aircraft and an expected amount of energy for the aircraft.

In another illustrative embodiment, an apparatus comprises a computer system. The computer system is configured to identify a current configuration for a number of control surfaces for an aircraft during flight of the aircraft. The computer system is configured to identify a selected point in time at which the current configuration for the number of control surfaces is to be changed to a new configuration for the number of control surfaces. The computer system is configured to identify a portion of time relative to the selected point in time during which the current configuration for the number of control surfaces is to be changed to the new configuration based on a difference between a current amount of energy for the aircraft and an expected amount of energy for the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
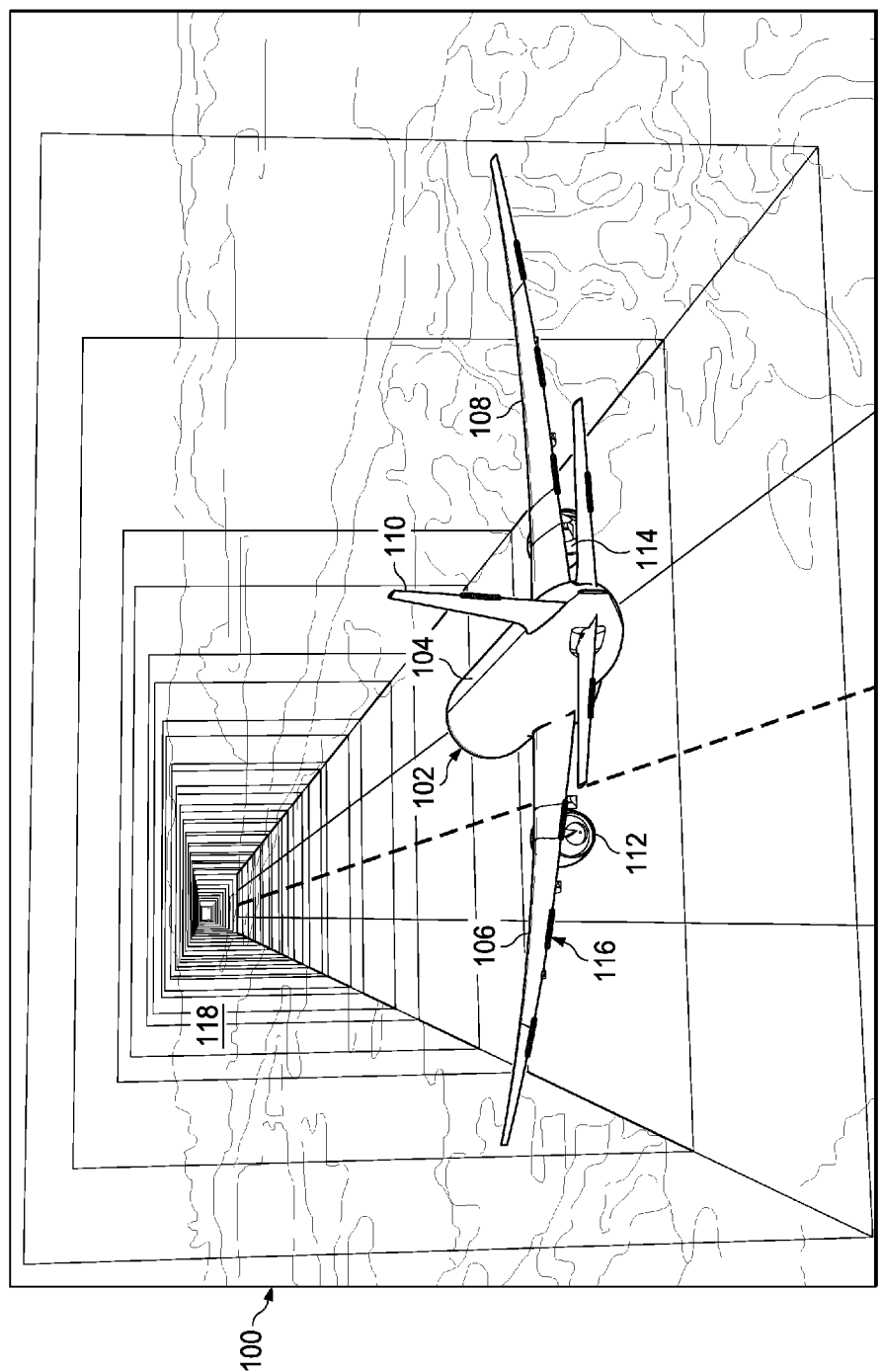
FIG. 1 is an illustration of a flight environment in accordance with an illustrative embodiment.

With reference now to FIG. 1, an illustration of a flight environment is depicted in accordance with an illustrative embodiment. In this illustrative example, flight environment 100 is an example of an environment in which the different illustrative embodiments may be implemented to control flight of aircraft 102 in flight environment 100.

As depicted, aircraft 102 comprises fuselage 104, wing 106, wing 108, tail 110, wing-mounted engine 112, and wing-mounted engine 114. Additionally, aircraft 102 has control surfaces 116. Control surfaces 116 allow an operator of aircraft 102 to adjust the flight of aircraft 102. For example, the configuration of control surfaces 116 may be changed at various points in time and/or at various locations during the flight of aircraft 102 to adjust the flight of aircraft 102 through various axes with respect to aircraft 102 and/or adjust the speed of aircraft 102.

In this manner, the configuration of control surfaces 116 may be controlled such that aircraft 102 substantially maintains a desired trajectory in flight environment 100. In these illustrative examples, the desired trajectory is a four-dimensional trajectory that takes into account latitude, longitude, altitude, and time.

As depicted, volume 118 in flight environment 100 is a three-dimensional volume in flight environment 100. Volume 118 indicates the portion of airspace in flight environment 100 within which aircraft 102 needs to fly such that aircraft 102 substantially maintains the desired trajectory within desired tolerances. These desired tolerances may also be referred to as required navigation performance (RNP) limits.

The different illustrative embodiments recognize and take into account a number of different considerations. The different illustrative embodiments recognize and take into account that existing processes indicate when a configuration of flaps should be changed based on the speed of the aircraft. For example, once a particular speed is reached by an aircraft, an indication is presented to the pilot to change the configuration of flaps. The different illustrative embodiments recognize and take into account that currently used processes for identifying changes in configurations of control surfaces do not take into account energy of the aircraft.

The different illustrative embodiments recognize and take into account that the current guidance on changing the configuration of flaps is based on compliance with different procedures. These procedures may be set by the airline, a government authority, or some other source. The different illustrative embodiments recognize and take into account that these types of procedures do not aid the pilot in adhering to a particular trajectory that is desired for the aircraft.

Thus, the different illustrative embodiments provide a method and apparatus for managing a number of control surfaces for an aircraft. In one illustrative embodiment, a current configuration for the number of control surfaces for the aircraft is identified during flight of the aircraft. A selected point in time at which the current configuration for the number of control surfaces is to be changed to a new configuration for the number of control surfaces is identified. A portion of time relative to the selected point in time during which the current configuration for the number of control surfaces is to be changed to the new configuration is identified based on a difference between a current amount of energy for the aircraft and an expected amount of energy for the aircraft.

Figure 2:
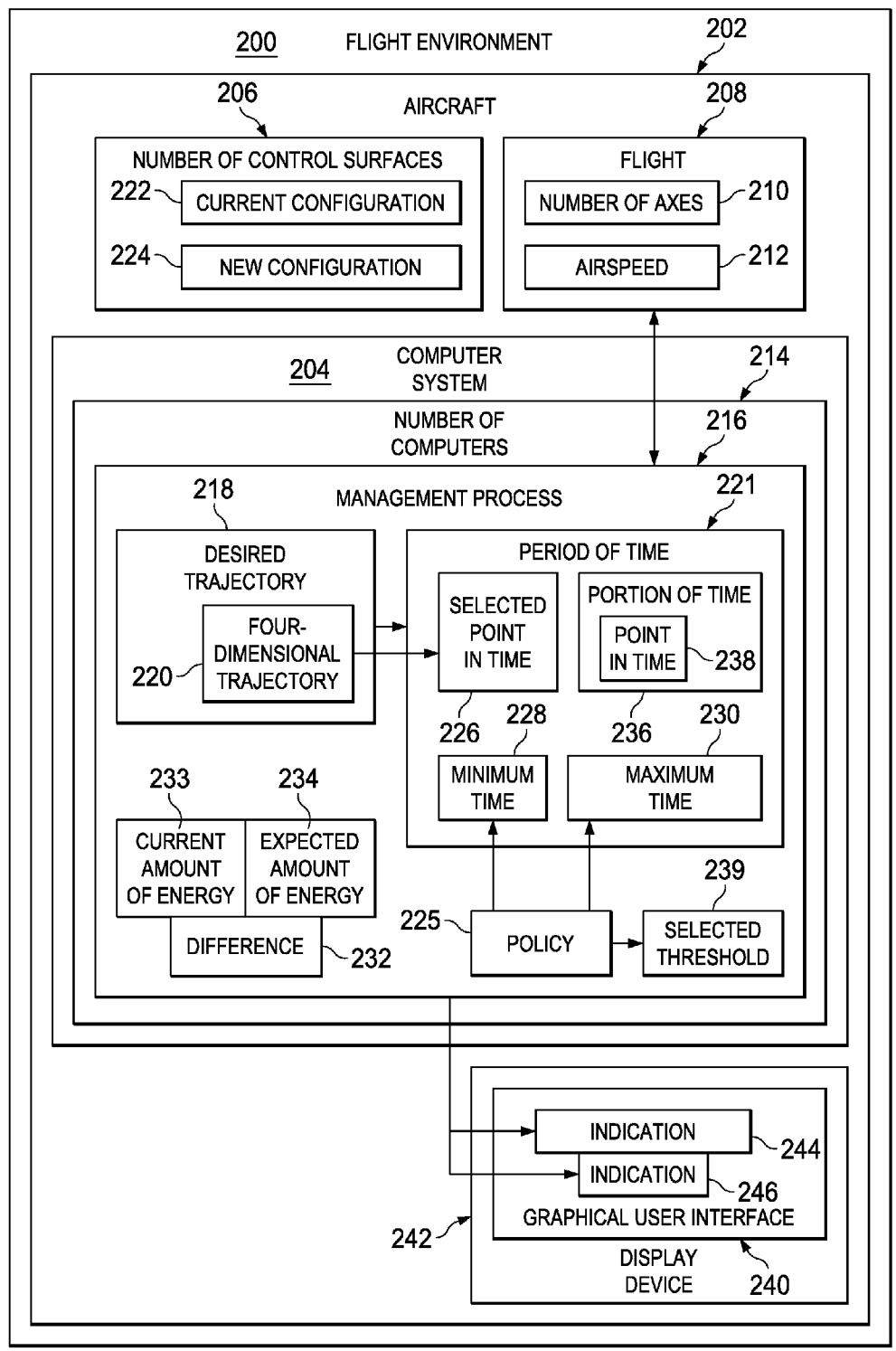
FIG. 2 is an illustration of a flight environment in accordance with an illustrative embodiment.

With reference now to FIG. 2, an illustration of a flight environment is depicted in accordance with an illustrative embodiment. In these illustrative examples, flight environment 100 in FIG. 1 is an example of one implementation for flight environment 200 in FIG. 2. Flight environment 200 includes aircraft 202 and computer system 204 associated with aircraft 202.

As depicted, aircraft 202 has number of control surfaces 206. Number of control surfaces 206 may include primary and/or secondary control surfaces. In these illustrative examples, number of control surfaces 206 includes secondary control surfaces, such as, for example, without limitation, flaps, slats, spoilers, airbrakes, and/or other suitable types of secondary control surfaces. In some illustrative examples, number of control surfaces 206 may include primary control surfaces, such as, for example, without limitation, elevators.

Number of control surfaces 206 allows an operator of aircraft 202 to adjust flight 208 of aircraft 202. As one illustrative example, a configuration of primary control surfaces in number of control surfaces 206 may be changed to adjust flight 208 with respect to number of axes 210 through aircraft 202, airspeed 212 of aircraft 202, and/or other suitable factors during flight 208. Number of axes 210 may include, for example, a pitch axis, a roll axis, and a yaw axis through aircraft 202. Airspeed 212 is a true airspeed for aircraft 202 in these examples.

In these illustrative examples, computer system 204 is located in aircraft 202. Computer system 204 takes the form of number of computers 214 in these depicted examples. Management process 216 runs on one or more of number of computes 214.

Management process 216 is configured to identify when changes may be made to the configuration of number of control surfaces 206 to adjust flight 208 of aircraft 202. In particular, management process 216 is configured to identify when to make changes to the configuration of number of control surfaces 206 to substantially maintain desired trajectory 218 for aircraft 202.

In these depicted examples, desired trajectory 218 is four-dimensional trajectory 220. Four-dimensional trajectory 220 is a trajectory for aircraft 202 that takes into account latitude, longitude, altitude, and time. In other words, four-dimensional trajectory 220 is the trajectory for aircraft 202 with respect to latitude, longitude, and altitude with respect to time during flight 208 of aircraft 202.

Four-dimensional trajectory 220 may be identified in a flight plan for flight 208 of aircraft 202. Four-dimensional trajectory 220 may be selected prior to flight 208 of aircraft 202 and/or during flight 208. Further, four-dimensional trajectory 220 may be changed during flight 208 based on a number of factors, such as, for example, without limitation, a change in weather, a change in a mission for aircraft 202, a change in the destination for flight 208, and/or other suitable factors.

As depicted in these examples, management process 216 identifies selected point in time 226 using four-dimensional trajectory 220. Selected point in time 226 is the point in time at which current configuration 222 for number of control surfaces 206 is to be changed to new configuration 224 for number of control surfaces 206 based on four-dimensional trajectory 220 for flight 208 of aircraft 202.

In these illustrative examples, a configuration for number of control surfaces 206 includes whether each of number of control surfaces 206 is extended or retracted. Further, the configuration for number of control surfaces 206 includes by how much each of number of control surfaces 206 is extended if the control surface is extended.

As one illustrative example, in current configuration 222, all of number of control surfaces 206 may be fully retracted. Current configuration 222 for number of control surfaces 206 may be changed to adjust flight 208 of aircraft 202 based on four-dimensional trajectory 220. Current configuration 222 may be changed to new configuration 224 in which all control surfaces in number of control surfaces 206 are fully extended.

Additionally, management process 216 identifies period of time 221. Period of time 221 includes minimum time 228, maximum time 230, and all times between minimum time 228 and maximum time 230. Selected point in time 226 is a time between minimum time 228 and maximum time 230. Minimum time 228 is the earliest time before selected point in time 226 at which a change from current configuration 222 for number of control surfaces 206 to new configuration 224 may occur. Maximum time 230 is the latest time after selected point in time 226 at which a change from current configuration 222 for number of control surfaces 206 to new configuration 224 may occur.

In these illustrative examples, minimum time 228 and maximum time 230 may be selected based on, for example, without limitation, policy 225. Policy 225 may be a number of rules, guidelines, and/or criteria for the timing involved with changing the configuration for number of control surfaces 206. As one illustrative example, policy 225 may be set by the airline to which aircraft 202 belongs.

Further, in these examples, the time difference between selected point in time 226 and minimum time 228, and the time difference between selected point in time 226 and maximum time 230 may be substantially the same. Of course, in other illustrative examples, these time differences may not be the same.

Management process 216 identifies difference 232 between current amount of energy 233 for aircraft 202 and expected amount of energy 234 for aircraft 202. In these illustrative examples, an amount of energy for aircraft 202 is with respect to a groundspeed and altitude for aircraft 202. This amount of energy is aircraft-specific energy in these illustrative examples. Further, the amount of energy for aircraft 202 is the combined kinetic and potential energy of aircraft 202 at any given point in time during flight 208. In other words, the amount of energy is the total energy of aircraft 202.

In these depicted examples, expected amount of energy 234 is the amount of energy needed for aircraft 202 to substantially maintain four-dimensional trajectory 220. In other words, expected amount of energy 234 is the amount of energy expected for aircraft 202 based on four-dimensional trajectory 220.

Difference 232 between current amount of energy 233 and expected amount of energy 234 may be caused by a number of factors. For example, the number of factors that may lead to difference 232 may include at least one of weather, wind, and a change in a direction for aircraft 202, and other suitable types of factors.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In these illustrative examples, management process 216 may make the assumption that airspeed 212 of aircraft 202 stays substantially the same just prior to and after a change in the configuration for number of control surfaces 206. Based on this assumption, difference 232 in expected amount of energy 234 for aircraft 202 may be attributed substantially to the change in altitude of aircraft 202 when the configuration of number of control surfaces 206 is changed. In these examples, the substantially same airspeed 212, just prior to and after a change in the configuration for number of control surfaces 206, may be maintained using, for example, without limitation, primary control surfaces.

Additionally, management process 216 identifies portion of time 236 relative to selected point in time 226 based on difference 232. In these examples, portion of time 236 is in period of time 221. Changing current configuration 222 for number of control surfaces 206 to new configuration 224 during portion of time 236 reduces difference 232 between current amount of energy 233 and expected amount of energy 234 for aircraft 202. This reduction in difference 232 in expected amount of energy 234 allows aircraft 202 to substantially maintain four-dimensional trajectory 220 when the configuration for number of control surfaces 206 is changed.

In these illustrative examples, portion of time 236 may be or may include point in time 238. Point in time 238 is relative to selected point in time 226. For example, point in time 238 may be before or after selected point in time 226.

Point in time 238 is the point in time in period of time 221 at which a change from current configuration 222 to new configuration 224 reduces difference 232. In other words, point in time 238 is the point in time at which current configuration 222 is to be changed to new configuration 224 based on difference 232 between current amount of energy 233 and expected amount of energy 234 for aircraft 202.

In other words, a change from current configuration 222 to new configuration 224 at point in time 238 reduces difference 232 between current amount of energy 233 and expected amount of energy 234 for aircraft 202 such that aircraft 202 substantially maintains four-dimensional trajectory 220 when the configuration for number of control surfaces 206 is changed. In particular, point in time 238 may be the point in time at which changing the configuration for number of control surfaces 206 at point in time 238 reduces difference 232 the most, as compared to changing the configuration for number of control surfaces 206 at other points in time within period of time 221.

In these illustrative examples, when current amount of energy 233 is greater than expected amount of energy 234, point in time 238 may be an earlier point in time than selected point in time 226. In a similar manner, when expected amount of energy 234 is greater than current amount of energy 233, point in time 238 may be a later point in time than selected point in time 226.

Additionally, in some illustrative examples, portion of time 236 may also include other points in time in period of time 221 within selected threshold 239 of point in time 238. Selected threshold 239 may be selected using, for example, policy 225. As one illustrative example, selected threshold 239 is about three minutes before and about three minutes after point in time 238. In this example, portion of time 236 includes point in time 238 and other points in time that are within about three minutes before and about three minutes after point in time 238.

In these illustrative examples, management process 216 is configured to display graphical user interface 240 on display device 242 aircraft 202. Display device 242 in aircraft 202 is associated with computer system 204. For example, display device 242 may be connected to computer system 204 in aircraft 202.

Management process 216 displays indication 244 of selected point in time 226 on graphical user interface 240. Further, management process 216 displays indication 246 of portion of time 236 on graphical user interface 240. In particular, management process 216 may display indication 246 of portion of time 236 relative to indication 244 of period of time 221.

For example, indication 244 for selected point in time 226 may be displayed on a timeline. Further, indicators may be displayed to indicate minimum time 228 and maximum time 230 for period of time 221 on a timeline. Indication 246 for portion of time 236 may be an icon or some other suitable type of graphical indicator selected to represent point in time 238. Management process 216 may display the icon on the timeline on graphical user interface 240 to indicate, for example, to an operator of aircraft 202, when to change current configuration 222 for number of control surfaces 206 to new configuration 224 based on difference 232.

In these illustrative examples, indication 246 for portion of time 236 may also include graphical indicators indicating the boundaries on the timeline for portion of time 236 relative to period of time 221.

In these illustrative examples, an operator of aircraft 202 may use indication 246 to determine when to change current configuration 222 for number of control surfaces 206 to new configuration 224 based on difference 232 between current amount of energy 233 and expected amount of energy 234. In this manner, the operator of aircraft 202 may adjust flight 208 of aircraft 202 to substantially maintain desired trajectory 218 for aircraft 202.

The illustration of flight environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, a portion of the computers in number of computers 214 may be located remote to aircraft 202. In some illustrative examples, aircraft 202 may take other forms other than, for example, aircraft 102 in FIG. 1. Aircraft 202 may be, without limitation, a manned airplane, an unmanned aerial vehicle, or some other suitable type of aircraft.

In other illustrative examples, indication 246 may be generated by management process 216 but not displayed on a display device. Management process 216 may use indication 246 and a number of rules and/or guidelines in policy 225 to select a time at which to change current configuration 222 for number of control surfaces 206 to new configuration 224 without operator input. This type of process may occur when aircraft 202 is, for example, without limitation, an unmanned aerial vehicle.

Figure 3:
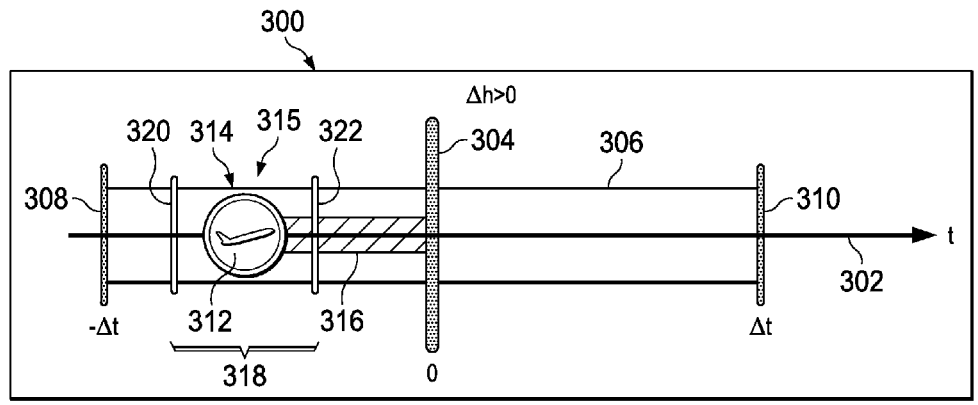
FIG. 3 is an illustration of a graphical user interface in accordance with an illustrative embodiment.

With reference now to FIG. 3, an illustration of a graphical user interface is depicted in accordance with an illustrative embodiment. In this illustrative example, graphical user interface 300 is an example of one implementation for graphical user interface 240 in FIG. 2. Graphical user interface 300 is displayed on a display device in an aircraft, such as display device 242 in aircraft 202 in FIG. 2.

As depicted, timeline 302 is displayed on graphical user interface 300 during a flight of the aircraft, such as flight 208 of aircraft 202 in FIG. 2. In this illustrative example, selected point in time 304 is displayed on timeline 302. Selected point in time 304 is an example of one implementation for indication 244 for period of time 221 in FIG. 2. Selected point in time 304 indicates a point in time selected for changing a current configuration for a number of control surfaces for the aircraft to a new configuration for the number of control surfaces. Selected point in time 304 is selected based on a desired trajectory for the flight of the aircraft. The desired trajectory may be, for example, without limitation, four-dimensional trajectory 220 in FIG. 2.

Further, selected point in time 304 indicates a point in time within period of time 306. Period of time 306 includes the points in time within the portion of timeline 302 bounded by minimum time 308 and maximum time 310. In particular, period of time 306 is the range of points in time with respect to selected point in time 304 during which a change from a current configuration for the number of control surfaces to a new configuration may occur based on, for example, a policy.

In this illustrative example, graphical indicator 312 is displayed at location 314 on timeline 302. Location 314 of graphical indicator 312 indicates point in time 315 in period of time 306. Point in time 315 is the point in time at which changing the current configuration for the number of control surfaces to the new configuration reduces a difference between a current amount of energy and an expected amount of energy for the aircraft such that the aircraft substantially maintains the desired trajectory when the configuration for the number of control surfaces is changed. In this depicted example, indicator 316 is a graphical bar that indicates the time difference between selected point in time 304 and point in time 315.

Further, portion of time 318 in period of time 306 may be indicated by indicator 320 and indicator 322 displayed on timeline 302. In other words, indicator 320 and indicator 322 indicate the boundaries for portion of time 318. In this illustrative example, portion of time 318 includes all the points in time in period of time 306 that are within a selected threshold of point in time 315. The selected threshold is indicated by indicator 320 and indicator 322.

An operator of an aircraft may use point in time 315 and/or portion of time 318 displayed on timeline 302 to determine when to change the current configuration for the number of control surfaces to the new configuration such that the aircraft can substantially maintain the desired trajectory.

Figure 4:
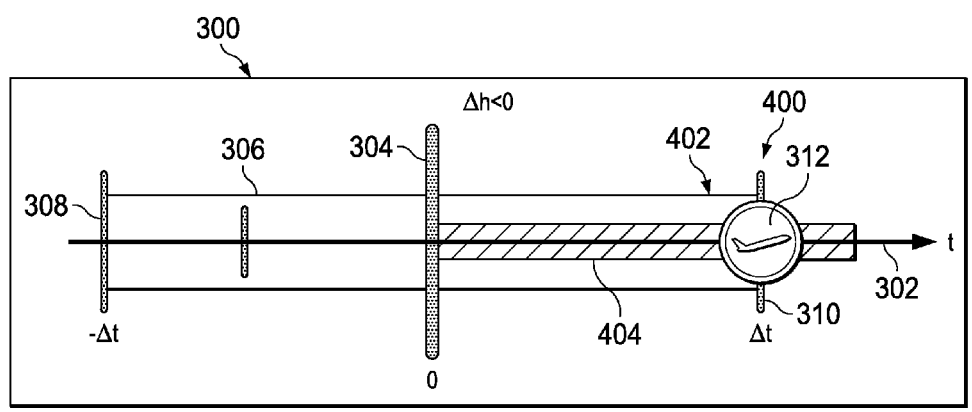
FIG. 4 is an illustration of a graphical user interface in accordance with an illustrative embodiment.

With reference now to FIG. 4, an illustration of a graphical user interface is depicted in accordance with an illustrative embodiment. In this illustrative example, the management process identifies a point in time at which changing the current configuration for the number of control surfaces to the new configuration reduces a difference between a current amount of energy and an expected amount of energy for the aircraft such that the aircraft substantially maintains the desired trajectory when the configuration for the number of control surfaces is changed.

In this illustrative example, this identified point in time is outside period of time 306. More specifically, in this example, the identified point in time is later than maximum time 310.

When the identified point in time is outside period of time 306, a new point in time is identified. Point in time 400 is this new point in time. For example, when the point in time identified is earlier than minimum time 308, the new point in time is minimum time 308. When the point in time identified is later maximum time 310, the new point in time is maximum time 310.

In this illustrative example, the new point in time corresponds to the closest boundary for period of time 306, which is maximum time 310. As depicted in this example, graphical indicator 312 is displayed at location 402 at maximum time 310. Additionally, indicator 404 is displayed on graphical user interface 300. Indicator 404 is a graphical bar indicating the time difference between the point in time identified by the management process and selected point in time 304.

Figure 5:
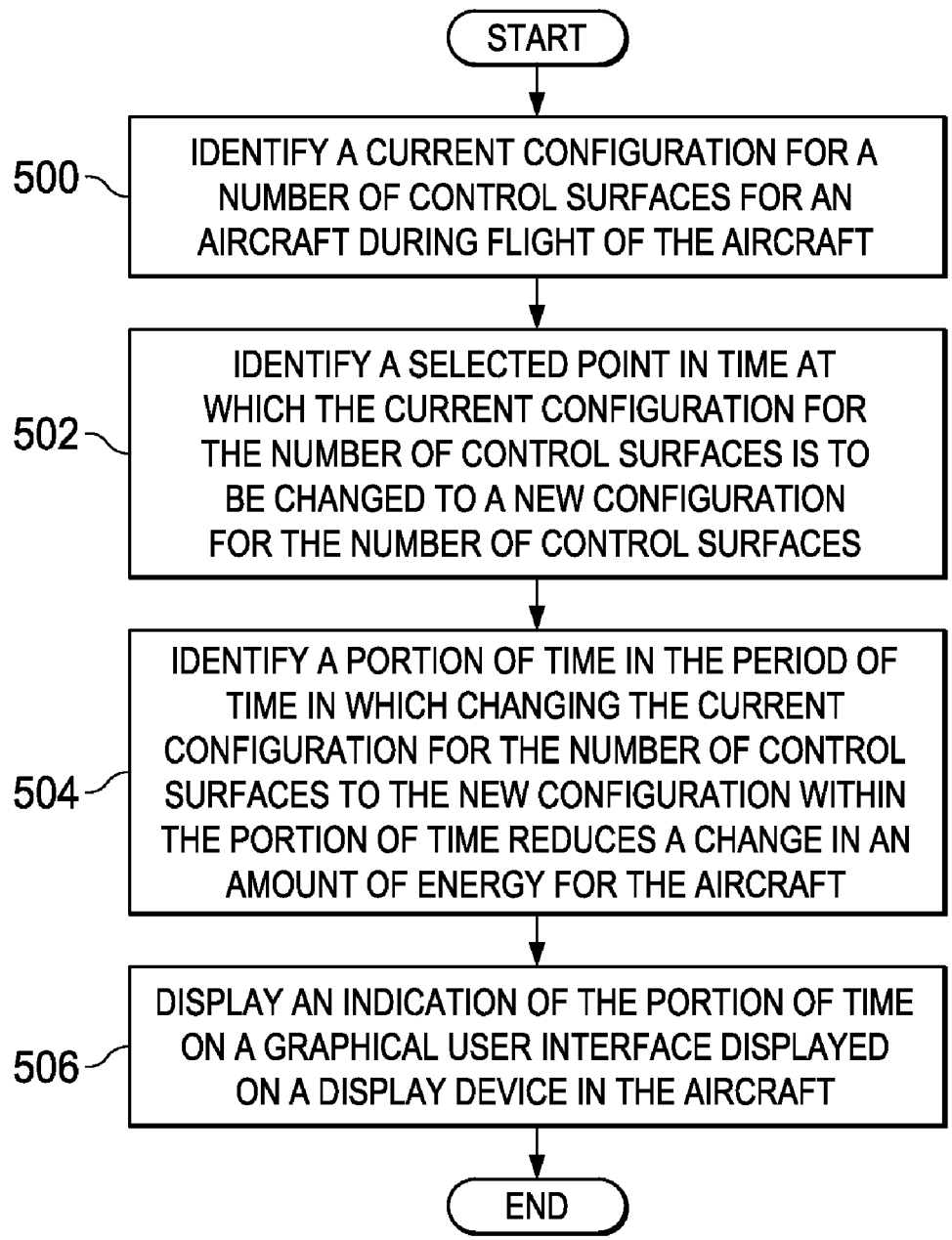
FIG. 5 is an illustration of a flowchart of a process for managing control surfaces for an aircraft in accordance with an illustrative embodiment.

With reference now to FIG. 5, an illustration of a flowchart of a process for managing control surfaces for an aircraft is depicted in accordance with an illustrative embodiment. The process illustrated in FIG. 5 may be implemented within, for example, flight environment 200 in FIG. 2. In particular, this process may be implemented using management process 216 in FIG. 2.

The process begins by identifying a current configuration for a number of control surfaces for an aircraft during flight of the aircraft (operation 500). The process identifies a selected point in time at which the current configuration for the number of control surfaces is to be changed to a new configuration for the number of control surfaces (operation 502). The selected point in time is identified based on a desired trajectory for the aircraft and/or a policy.

Thereafter, the process identifies a portion of time relative to the selected point in time during which the current configuration for the number of control surfaces is to be changed to the new configuration based on a difference between a current amount of energy for the aircraft and an expected amount of energy for the aircraft (operation 504). The process then displays an indication of the portion of time on a graphical user interface displayed on a display device in the aircraft (operation 506), with the process terminating thereafter.

Figure 6:
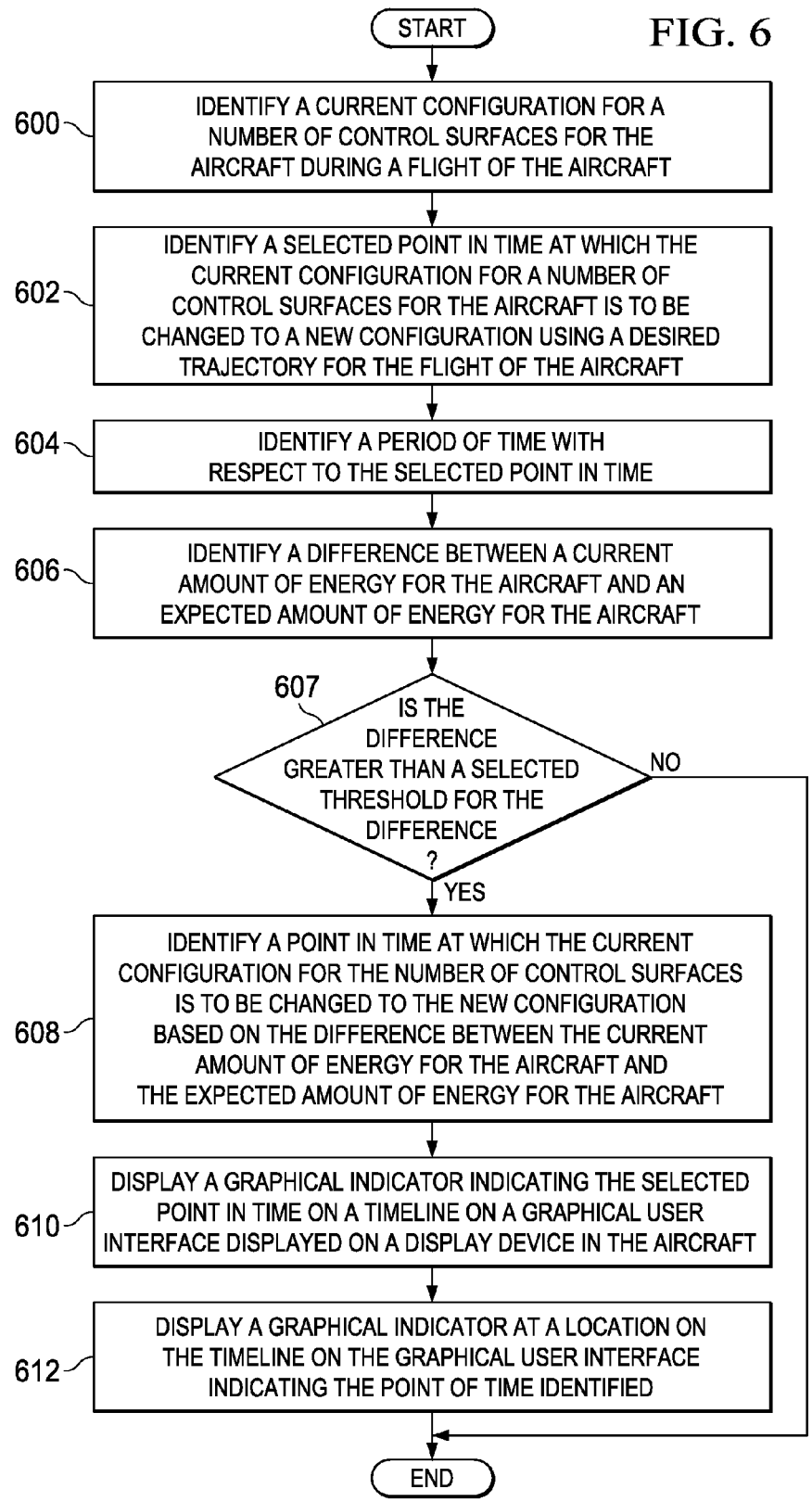
FIG. 6 is an illustration of a flowchart of a process for managing control surfaces for an aircraft in accordance with an illustrative embodiment.

With reference now to FIG. 6, an illustration of a flowchart of a process for managing control surfaces for an aircraft is depicted in accordance with an illustrative embodiment. The process illustrated in FIG. 6 may be implemented within, for example, flight environment 200 in FIG. 2. In particular, this process may be implemented using management process 216 in FIG. 2.

The process begins by identifying a current configuration for a number of control surfaces for the aircraft during a flight of the aircraft (operation 600). Thereafter, the process identifies a selected point in time at which the current configuration for a number of control surfaces for the aircraft is to be changed to a new configuration using a desired trajectory for the flight of the aircraft (operation 602). In this illustrative example, the desired trajectory is a four-dimensional trajectory.

Next, the process identifies a period of time with respect to the selected point in time (operation 604). The period of time includes a minimum time earlier than the selected point in time and a maximum time later than the selected point in time. In operation 604, the period of time may be identified using a policy, such as policy 225 in FIG. 2.

The process then identifies a difference between a current amount of energy for the aircraft and an expected amount of energy for the aircraft (operation 606). The process identifies this difference as follows:

$$\Delta E = m^* g^* (h_{current} - h_{expected}) + 0.5^* m^* (v_{current}^2 - v_{expected}^2) \quad (1)$$

where $\Delta E$ is the difference between the current amount of energy for the aircraft and the expected amount of energy for the aircraft, m is mass of the aircraft, g is gravitational acceleration, $h_{current}$ is a current altitude of the aircraft, $h_{expected}$ is an expected altitude of the aircraft, $v_{current}$ is a current groundspeed of the aircraft, and $v_{expected}$ is an expected groundspeed of the aircraft.

Thereafter the process determines whether the difference is greater than a selected threshold for the difference (operation 607). The selected threshold may be selected based on a policy or a level of accuracy for the flight of the aircraft along the desired trajectory. If the difference is not greater than the selected threshold, the process then terminates.

Otherwise, if the difference is greater than the selected threshold, the process then identifies a point in time at which the current configuration for the number of control surfaces is to be changed to the new configuration based on the difference between the current amount of energy for the aircraft and the expected amount of energy for the aircraft (operation 608).

In operation 608, the process identifies a time difference between the point in time and the selected point in time identified in operation 602. This time difference is identified as follows:

$$\Delta t = \frac{2 \cdot \Delta h \cdot m \cdot g}{\rho \cdot V^3 \cdot S \cdot \Delta c_d} \quad (2)$$

where $\Delta t$ is the time difference from the selected point in time to the point in time identified, $\Delta h$ is a deviation in altitude for the aircraft, $\rho$ is air density at the current altitude of the aircraft, V is total airspeed for the aircraft, S is wingspan surface, and $\Delta c_d$ is a difference in a coefficient of drag for the aircraft.

In this illustrative example, the deviation in altitude for the aircraft is the deviation in altitude from the expected altitude for the aircraft based on the desired trajectory. The deviation in altitude takes into account the groundspeed of the aircraft. The deviation in altitude may be identified as follows:

$$\Delta h = \Delta E/(m^* g), \quad (3)$$

such that $$\Delta h = (h_{current} - h_{expected}) + [0.5^*(v_{current}^2 - v_{expected}^2)]/g. \quad (4)$$

Additionally, in this illustrative example, equation (2) may be derived as follows:

$$\dot{E} = m \cdot V \cdot \frac{dV}{dt} + m \cdot g \cdot \frac{dh}{dt} = V(T - D), \quad (5)$$

where $\dot{E}$ is an energy rate of change, h is altitude, T is thrust, and D is drag. The difference of the energy rate of change for the aircraft with the new configuration for the number of control surfaces and the energy rate of change for the aircraft with the current configuration for the number of control surfaces is as follows:

$$\dot{E}_1 - \dot{E}_0 = m \cdot g \cdot \left(\frac{dh}{dt_1} - \frac{dh}{dt_0}\right) + m \cdot V \cdot \left(\frac{dV}{dt_1} - \frac{dV}{dt_0}\right) \approx 0 = V(T - D_1) - V(T - D_0) \quad (6)$$

where 1 indicates the new configuration for the number of control surfaces and 0 indicates the current configuration for the number of control surfaces.

Using the assumption that the true airspeed of the aircraft remains substantially the same before and after the change in the configuration for the number of control surfaces, equation (6) may be simplified as follows:

$$\Delta \dot{E} = m \cdot g \cdot \Delta \frac{dh}{dt} = V(D_0 - D_1) \quad (7)$$

Equation (7) may be solved for time as follows:

$$\int \frac{m \cdot g}{V(D_0 - D_1)} \Delta dh = \int \Delta dt \quad (8)$$

where $$D_0 = c_{d,0} \cdot \frac{\rho}{2} \cdot S \cdot V^2, \quad (9)$$

$$D_1 = c_{d,1} \cdot \frac{\rho}{2} \cdot S \cdot V^2, \quad (10)$$

$$c_d = c_{d0} + c_{d2} \cdot c_l^2, \quad (11)$$

and $$c_l = \frac{m \cdot g}{\frac{\rho}{2} \cdot S \cdot V^2}; \quad (12)$$

where $c_d$ is a coefficient of drag and $c_l$ is a coefficient of lift. The difference in the coefficient of drag may be further simplified as follows:

$$\Delta c_d = x_{d,0} - c_{d,1} = (c_{d0,0} - c_{d0,1}) + (c_{d2,0} - c_{d2,1}) \cdot c_l^2 \quad (13)$$

Equation (8) may be solved for time to identify $\Delta t$ as seen in equation (2).

In this illustrative example, the process uses the time difference, $\Delta t$, to identify the point in time relative to the selected point in time in which changing the current configuration for the number of control surfaces to the new configuration at the point in time reduces the difference between the current amount of energy for the aircraft and the expected amount of energy for the aircraft. Further, the point in time identified in operation 608 reduces the deviation in altitude, $\Delta h$.

In this illustrative example, the process then displays a graphical indicator indicating the selected point in time on a timeline on a graphical user interface displayed on a display device in the aircraft (operation 610). The process then displays a graphical indicator at a location on the timeline on the graphical user interface indicating the point of time identified in operation 608 (operation 612), with the process terminating thereafter.

In some illustrative examples, in operation 612, the indication may include an indicator for the time difference between the point in time identified and the selected point in time identified.

In these illustrative examples, an operator may enter input that causes the configuration of the number of control surfaces to change to the new configuration at a time within the period of time indicated. In some illustrative examples, the process may use a number of rules and/or guidelines to select a point in time in the period of time indicated to cause the change in the configuration. Further, the process illustrated in FIG. 6 may be repeated a number of times during the flight of the aircraft.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, operation 606 for identifying the difference between the current amount of energy and the expected amount of energy may not be performed. For example, an operation identifying the deviation in altitude, $\Delta h$, may be performed in the place of operation 606. Operation 608 may then be performed to identify the point in time at which the current configuration for the number of control surfaces is to be changed to the new configuration based on the deviation in altitude from the expected altitude for the aircraft.

Thus, the different illustrative embodiments provide a method and apparatus for managing a number of control surfaces for an aircraft. A current configuration for the number of control surfaces for the aircraft is identified during flight of the aircraft. A period of time during which to change the current configuration for the number of control surfaces to a new configuration for the number of control surfaces is identified. A portion of time in the period of time is identified in which changing the current configuration for the number of control surfaces to the new configuration within the portion of time reduces a change in an amount of energy for the aircraft.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a number of control surfaces for an aircraft, the method comprising:
  identifying a current configuration for the number of control surfaces for the aircraft during flight of the aircraft;
  identifying a selected point in time at which the current configuration for the number of control surfaces is to be changed to a new configuration for the number of control surfaces; and
  identifying a portion of time relative to the selected point in time during which the current configuration for the number of control surfaces is to be changed to the new configuration based on a difference between a current amount of energy for the aircraft and an expected amount of energy for the aircraft, the identifying a portion of time including identifying a point in time relative to the selected point in time in which changing the current configuration for the number of control surfaces to the new configuration at the point in time reduces the difference between the current amount of energy for the aircraft and the expected amount of energy for the aircraft.

2. The method of claim 1, wherein the step of identifying the selected point in time at which the current configuration for the number of control surfaces is to be changed to the new configuration for the number of control surfaces comprises:
  identifying the selected point in time at which the current configuration for the number of control surfaces is to be changed to the new configuration for the number of control surfaces using a desired trajectory for the flight of the aircraft.

3. The method of claim 2, wherein the desired trajectory for the flight of the aircraft is a four-dimensional trajectory.

4. The method of claim 1 further comprising:
  identifying the difference between the current amount of energy for the aircraft and the expected amount of energy for the aircraft as follows:

$$\Delta E = m*g*(h_{current} - h_{expected}) + 0.5*m*(v_{current}^2 - v_{expected}^2),$$

where $\Delta E$ is the difference between the current amount of energy for the aircraft and the expected amount of energy for the aircraft, m is mass of the aircraft, g is gravitational acceleration, $h_{current}$ is a current altitude of the aircraft $h_{expected}$ is an expected altitude of the aircraft, $v_{current}$ is a current groundspeed of the aircraft, and $v_{expected}$ is an expected groundspeed of the aircraft.

5. The method of claim 1, wherein the point in time identified is within a period of time in which the period of time includes a minimum time, a maximum time, and all times between the minimum time and the maximum time, wherein the selected point in time is a time in the all times.

6. The method of claim 1, wherein the step of identifying the portion of time relative to the selected point in time during which the current configuration for the number of control surfaces is to be changed to the new configuration based on the difference between the current amount of energy for the aircraft and the expected amount of energy for the aircraft further comprises:
  identifying times within a selected threshold of the point in time identified such that the portion of time identified includes the times within the selected threshold and the point in time.

7. The method of claim 1 further comprising:
  identifying a deviation in altitude from an expected altitude for the aircraft, wherein the deviation in altitude takes into account a groundspeed of the aircraft and wherein the deviation in altitude of the aircraft is identified as follows:

$$\Delta h = (h_{current} - h_{expected}) + [0.5*(v_{current}^2 - v_{expected}^2)]/g,$$

where $\Delta h$ is the deviation in altitude, $h_{current}$ is a current altitude of the aircraft, $h_{expected}$ is the expected altitude of the aircraft, $v_{current}$ is a current groundspeed of the aircraft, $v_{expected}$ is an expected groundspeed of the aircraft, and g is gravitational acceleration.

8. The method of claim 7, wherein the step of identifying the portion of time relative to the selected point in time during which the current configuration for the number of control surfaces is to be changed to the new configuration based on the difference between the current amount of energy for the aircraft and the expected amount of energy for the aircraft further comprises:
  identifying a point in time relative to the selected point in time at which the current configuration for the number of control surfaces is to be changed to the new configuration to reduce the deviation in altitude using:

$$\Delta t = \frac{2 \cdot \Delta h \cdot m \cdot g}{\rho \cdot V^3 \cdot S \cdot \Delta c_d},$$

where $\Delta t$ is a time difference from the selected point in time to the point in time identified, m is mass of the aircraft, $\rho$ is air density at the current altitude of the aircraft, V is a true airspeed for the aircraft, S is wingspan surface, $\Delta c_d$ is a change in a coefficient of drag for the aircraft.

9. The method of claim 1 further comprising:
  displaying an indication of the selected point in time on a graphical user interface; and
  displaying the indication of the portion of time relative to the indication of the selected point in time on the graphical user interface.

10. The method of claim 9, wherein the indication of the selected point in time is displayed on a timeline on the graphical user interface and wherein the step of displaying the indication of the portion of time relative to the indication of the selected point in time on the graphical user interface comprises:
  displaying a graphical indicator at a location on the timeline, wherein the location of the graphical indicator on the timeline indicates a point in time relative to the selected point in time at which the current configuration for the number of control surfaces is to be changed to the new configuration based on the difference between the current amount of energy for the aircraft and the expected amount of energy for the aircraft.

11. The method of claim 10, wherein the graphical indicator is a first graphical indicator and wherein the step of displaying the indication of the portion of time relative to the indication of the period of time on the graphical user interface further comprises:

displaying a second graphical indicator and a third graphical indicator on the timeline, wherein a portion of the timeline from the second graphical indicator to the third graphical indicator indicates the portion of time during which the current configuration for the number of control surfaces is to be changed to the new configuration based on the difference between the current amount of energy for the aircraft and the expected amount of energy for the aircraft.

12. The method of claim 1, wherein the difference between the current amount of energy for the aircraft and the expected amount of energy for the aircraft is caused by a number of factors selected from a group comprising weather, wind, and a change in a direction for the aircraft.

13. The method of claim 1, wherein an amount of energy for the aircraft comprises potential energy for the aircraft and kinetic energy for the aircraft.

14. The method of claim 1 further comprising:
changing the current configuration for the number of control surfaces to the new configuration at a point in time in the portion of time identified.

15. An apparatus comprising:
a computer system configured to identify a current configuration for a number of control surfaces for an aircraft during flight of the aircraft; identify a selected point in time at which the current configuration for the number of control surfaces is to be changed to a new configuration for the number of control surfaces; and identify a portion of time relative to the selected point in time during which the current configuration for the number of control surfaces is to be changed to the new configuration based on a difference between a current amount of energy for the aircraft and an expected amount of energy for the aircraft, to identify a portion of time including identifying a point in time relative to the selected point in time in which changing the current configuration for the number of control surfaces to the new configuration at the point in time reduces the difference between the current amount of energy for the aircraft and the expected amount of energy for the aircraft.

16. The apparatus of claim 15, wherein in being configured to identify the selected point in time at which the current configuration for the number of control surfaces is to be changed to the new configuration for the number of control surfaces, the computer system is configured to identify the selected point in time at which the current configuration for the number of control surfaces is to be changed to the new configuration for the number of control surfaces using a desired trajectory for the flight of the aircraft.

17. The apparatus of claim 16, wherein the desired trajectory for the flight of the aircraft is a four-dimensional trajectory.

18. The apparatus of claim 16, wherein the computer system is further configured to identify the difference between the current amount of energy for the aircraft and the expected amount of energy for the aircraft as follows:

$$\Delta E = m*g*(h_{current} - h_{expected}) + 0.5*m*(v_{current}^2 - v_{expected}^2),$$

where $\Delta E$ is the difference between the current amount of energy for the aircraft and the expected amount of energy for the aircraft, m is mass of the aircraft, g is gravitational acceleration, $h_{current}$ is a current altitude of the aircraft, $h_{expected}$ is an expected altitude of the aircraft, $v_{current}$ is a current groundspeed of the aircraft, and $v_{expected}$ is an expected groundspeed of the aircraft.

19. The apparatus of claim 15, wherein in being configured to identify the portion of time relative to the selected point in time during which the current configuration for the number of control surfaces is to be changed to the new configuration based on the difference between the current amount of energy for the aircraft and the expected amount of energy for the aircraft, the computer system is configured to identify a point in time relative to the selected point in time in which changing the current configuration for the number of control surfaces to the new configuration at the point in time reduces the difference between the current amount of energy for the aircraft and the expected amount of energy for the aircraft.

20. The apparatus of claim 19, wherein the point in time identified is within a period of time in which the period of time includes a minimum time, a maximum time, and all times between the minimum time and the maximum time, wherein the selected point in time is a time in the all times.

21. The apparatus of claim 19, wherein in being configured to identify the portion of time relative to the selected point in time during which the current configuration for the number of control surfaces is to be changed to the new configuration based on the difference between the current amount of energy for the aircraft and the expected amount of energy for the aircraft, the computer system is further configured to identify times within a selected threshold of the point in time identified such that the portion of time identified includes the times within the selected threshold and the point in time.

22. The apparatus of claim 15, wherein the computer system is further configured to identify a deviation in altitude from an expected altitude for the aircraft, wherein the deviation in altitude takes into account a groundspeed of the aircraft and wherein the deviation in altitude of the aircraft is identified as follows:

$$\Delta h = (h_{current} - h_{expected}) + [0.5*(v_{current}^2 - v_{expected}^2)]/g,$$

where $\Delta h$ is the deviation in altitude, $h_{current}$ is a current altitude of the aircraft, $h_{expected}$ is the expected altitude of the aircraft, $v_{current}$ is a current groundspeed of the aircraft, $v_{expected}$ is an expected groundspeed of the aircraft, and g is gravitational acceleration.

23. The apparatus of claim 22, wherein in being configured to identify the portion of time relative to the selected point in time during which the current configuration for the number of control surfaces is to be changed to the new configuration based on the difference between the current amount of energy for the aircraft and the expected amount of energy for the aircraft, the computer system is configured to identify a point in time relative to the selected point in time at which the current configuration for the number of control surfaces is to be changed to the new configuration to reduce the deviation in altitude using:

$$\Delta t = \frac{2 \cdot \Delta h \cdot m \cdot g}{\rho \cdot V^3 \cdot S \cdot \Delta c_d},$$

where $\Delta t$ is a time difference from the selected point in time to the point in time identified, m is mass of the aircraft, $\rho$ is air density at the current altitude of the aircraft, V is a true airspeed for the aircraft, S is wingspan surface, $\Delta c_d$ is a change in a coefficient of drag for the aircraft.

24. The apparatus of claim 15 further comprising:
a display device connected to the computer system in the aircraft, wherein the computer system is configured to display an indication of the portion of time on a graphical user interface displayed on a display device in the aircraft.

25. A method for managing a number of control surfaces for an aircraft, the method comprising:
identifying a current configuration for the number of control surfaces for the aircraft during flight of the aircraft;
identifying a selected point in time at which the current configuration for the number of control surfaces is to be changed to a new configuration for the number of control surfaces; and
identifying a portion of time relative to the selected point in time during which the current configuration for the number of control surfaces is to be changed to the new configuration based on a difference between a current amount of energy for the aircraft and an expected amount of energy for the aircraft, wherein the difference between the current amount of energy for the aircraft and the expected amount of energy for the aircraft is as follows:

$$\Delta E = m^* g^* (h_{current} - h_{expected}) + 0.5^* m^* (v_{current}^2 - v_{expected}^2),$$

where $\Delta E$ is the difference between the current amount of energy for the aircraft and the expected amount of energy for the aircraft, m is mass of the aircraft, g is gravitational acceleration, $h_{current}$ is a current altitude of the aircraft, $h_{expected}$ is an expected altitude of the aircraft, $v_{current}$ is a current groundspeed of the aircraft, and $v_{expected}$ is an expected groundspeed of the aircraft.

* * * * *